Patented June 1, 1954

2,680,119

UNITED STATES PATENT OFFICE 2,680,119

METHOD FOR THE PRODUCTION OF KHELLIN AND RELATED COMPOUNDS

Alexander Robertson, Liverpool, and James R. Clarke, Manchester, England, assignors to Smith, Kline & French Laboratories, Philadelphia, Pa., a corporation of Pennsylvania Application August 20, 1949, Serial No. 111,426

12 Claims. (Cl. 260—345.2)

This invention relates to a method for the synthetic production of khellin and related compounds, products possessing physiological activity adapting them for use variously in medicine.

This invention also contemplates not only the complete synthesis, but the several steps thereof and the novel intermediates prepared thereby.

The method broadly and specifically in accordance with this invention will be described generally and by specific example with reference to the accompanying drawings, from an inspection of which, in the light of the following description, procedure according to the method and the several steps thereof will be made apparent, as will also the structure of the several novel intermediates broadly and specifically.

Figure 1:
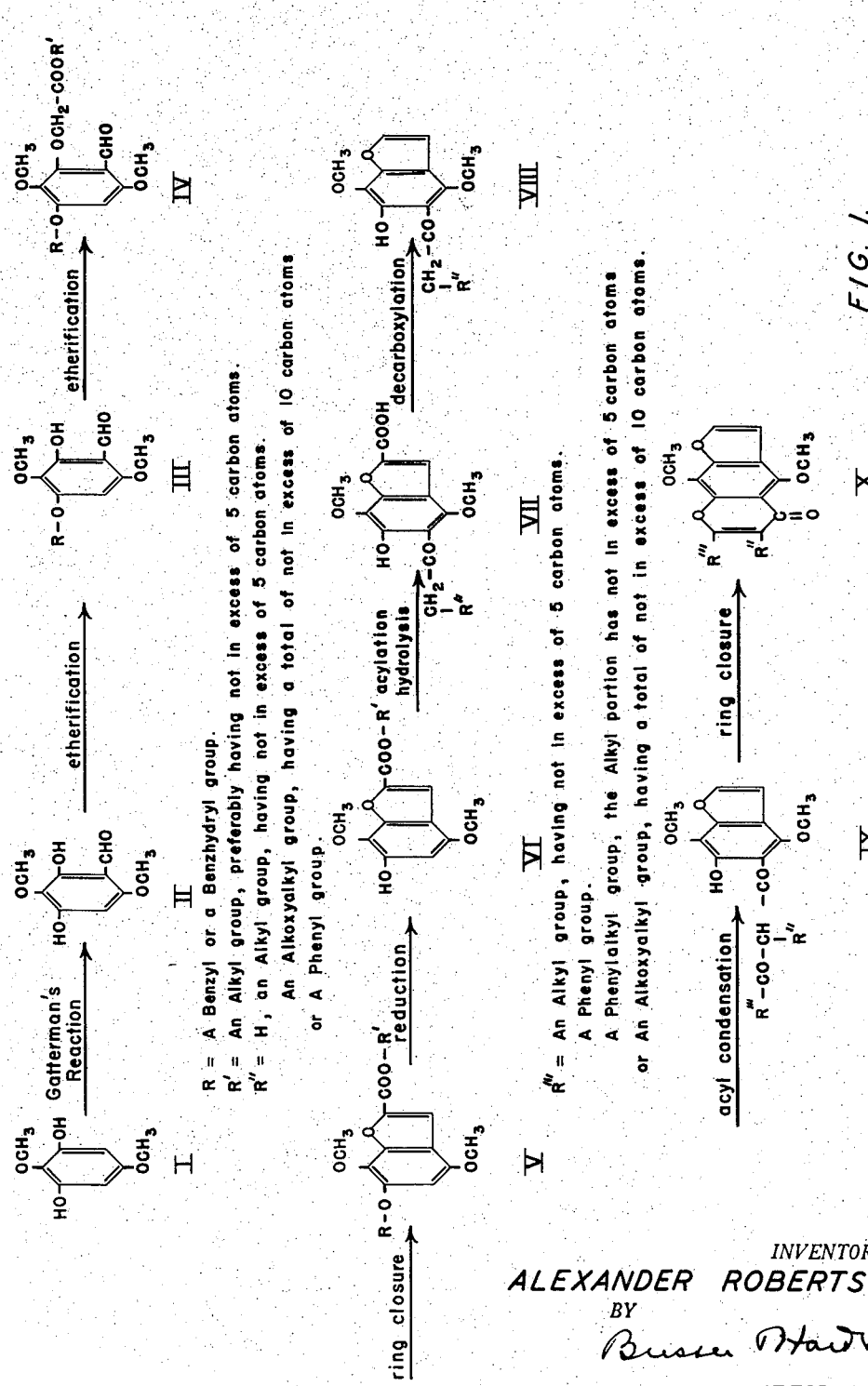

Figure 1 of the drawings exemplifies the method in accordance with this invention for the production of khellin and related compounds and exemplifies the structure of the several corresponding intermediates produced.

Figure 2:
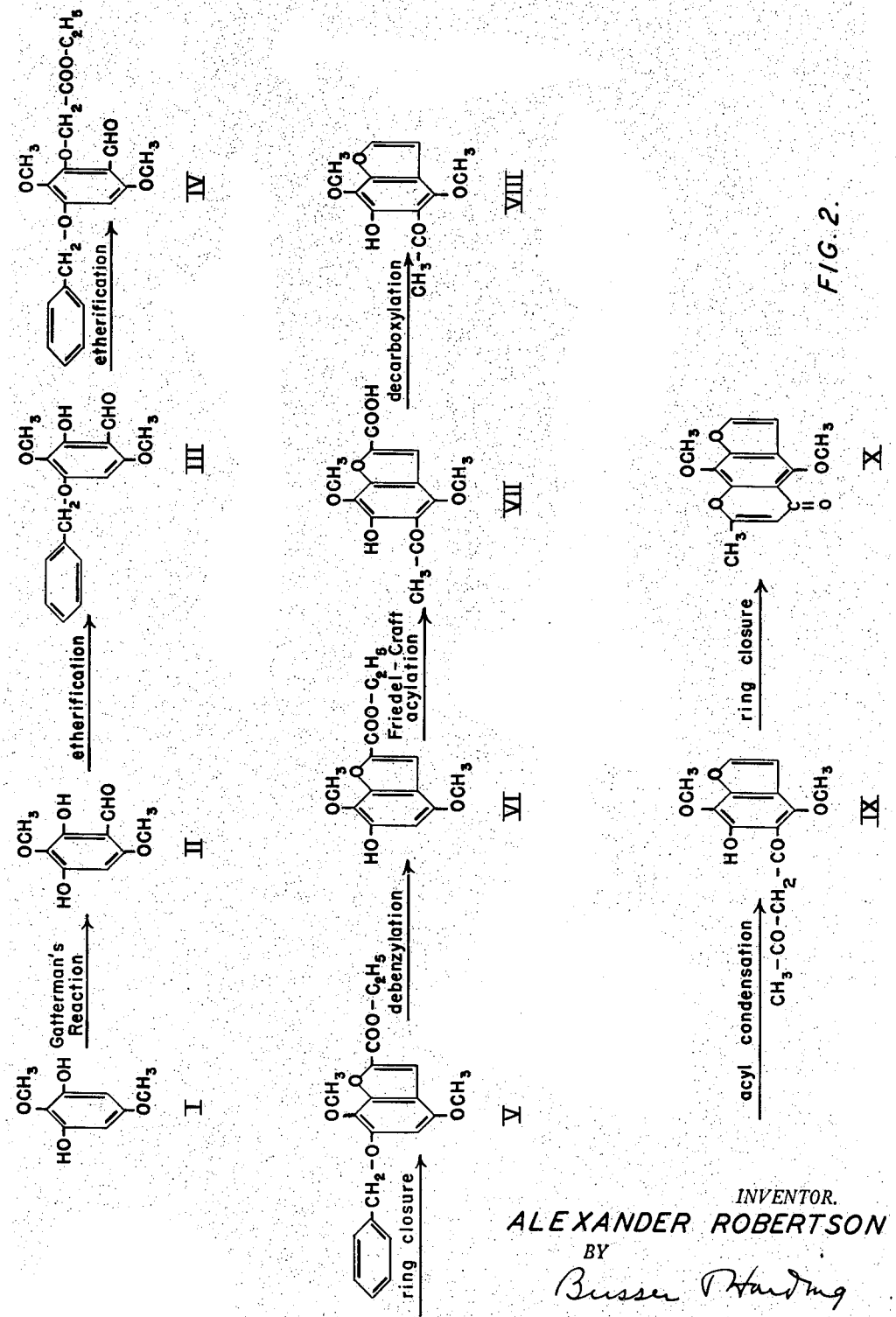

Figure 2 of the drawings exemplifies the adaptation of the method according to this invention to the production of khellin specifically and exemplifies specifically the several intermediates produced in the production thereof.

With reference to Figure 1, compound I (dimethoxyresorcinol) the starting material, is a known compound.

In the first step according to the method compound I is treated with, for example, HCN in the Gatterman reaction and the product is hydrolyzed to produce the aldehydes compound II.

The aldehyde compound II is a novel compound and has utility in the preparation of khellin and related compounds according to the method of this invention.

In the second step of the method the aldehyde compound II is reacted for the production of the compounds III, wherein R is a benzyl or benzhydryl group.

The production of compounds III will be accomplished by heating compound II in a solvent, as acetone, with a benzyl halide, as benzyl chloride or bromide, or with a benzhydryl halide, as benzhydryl chloride or bromide, depending upon the desired constituent for R, with an alkali, as, for example, potassium carbonate, and recovering the product compounds III by evaporating off the solvent after removal of the alkali salts.

Compounds III are new compounds and have utility as intermediates in the preparation of khellin and related compounds.

The third step in the method involves the treatment of compounds III to produce compounds IV, wherein R is as given above and R' is an alkyl group, preferably one having not in excess of five carbon atoms.

The production of compounds IV will be accomplished by the treatment of the compounds III for etherification of the hydroxyl group. This will be accomplished by refluxing the compounds III in a solvent, for example, acetone, containing an alkyl haloacetate, as alkyl chloroacetate or alkylbromoacetate, the alkyl portion preferably having not in excess of five carbon atoms, together with potassium carbonate. The resultant compounds IV will be isolated by evaporation off of the solvent. The resulting oil will be further purified by crystallization or distillation as required.

The compounds IV are new compounds and will have utility as intermediates in the preparation of khellin and related compounds.

The fourth step of the method involves treatment of compounds IV with alcoholic alkali metal alkyloxide, the alkyl portion of which preferably does not exceed five carbon atoms, by addition to a suspension of compounds IV in absolute alcohol with agitation. Compounds V will gradually be deposited.

Compounds V are new and have utility as intermediates in the preparation of khellin and related compounds.

The fifth step of the process for the production of compounds VI involves hydrogenation of the compounds V in solution in, for example, acetic acid containing a hydrogenation catalyst, as, for example, palladium-charcoal, Raney nickel, or the like.

Compounds VI are new and have utility as intermediates in the preparation of khellin and related compounds.

The sixth step of the process for the production of compounds VII, wherein R'' is hydrogen, alkyl not in excess of five carbon atoms, or phenyl, involves the addition of an acid catalyst, as, for example, aluminum chloride, to the compounds VI, together with an acyl halide, as an acyl chloride or bromide in a solvent, for example, nitrobenzene, maintained at a low temperature for a period and then at room temperature and then poured onto ice. A light petroleum (for example, B. P. 60–80°) is then added and after a period the aqueous layer is removed and the light petroleum nitrobenzene (solvent layer) extracted with sodium hydrogen carbonate and then with a plurality of increments of aqueous sodium hydroxide. The product, compounds VII, is recovered as a flocculent precipitate on acidification of the combined aqueous sodium hydroxide extracts with, for example, hydrochloric acid.

The compounds VII are new compounds and find utility as intermediates in the preparation of khellin and related compounds.

The seventh step of the method for the production of compounds VIII, which comprises khellinone, a known compound, and compounds related thereto which are novel and have utility in the preparation of khellin and related compounds, comprises essentially decarboxylation of compounds VII, which will be accomplished by refluxing compounds VII in a solvent, as, for example, absolute quinoline containing a catalyst, as, for example, copper bronze, the compounds VIII being recovered after filtering for removal of the solvent, as, for example, by extraction with a plurality of increments of hydrochloric acid and then with aqueous sodium hydrogen carbonate to remove traces of unchanged acid, and finally with a plurality of increments of sodium hydroxide. The sodium hydroxide increments are combined, acidified with hydrochloric acid and extracted several times with ether.

Compounds VIII will be obtained by evaporation of the ethereal extracts. The resulting oil will be further purified by crystallization or distillation as required.

The eighth step of the method for the production of compounds IX, in which R''' is alkyl not in excess of five carbon atoms, phenyl, phenylalkyl, the alkyl portion of which has not in excess of five carbon atoms; or alkoxyalkyl having a total of not in excess of 10 carbon atoms, will involve condensation of the compounds VIII, which will be accomplished by treatment of compounds VIII with an ester of the acid corresponding to the R''' CO radical to be introduced, as ethyl, methyl, propyl acetates, ethyl phenyl acetate, ethyl benzoate, ethyl ethoxyacetate in the presence of an alkali metal, as potassium or lithium, then heating for a period after the initial vigorous reaction has subsided, with the addition of more potassium or lithium after a period.

The product is obtained by addition of a little alcohol, as methyl, ethyl, propyl, or the like, alcohol to destroy traces of the alkali metal, dilution with water and acidification, as with acetic acid, which gives a brown oil, which is isolated by a suitable means, as, for example, ether extraction. The oil is purified by crystallization or distillation as required.

The compounds IX are new compounds and have utility as intermediates in the preparation of khellin and related compounds.

The ninth, or final step, of the process involves treatment of compounds IX to effect ring closure. This will be accomplished by boiling a solution of the diketone, compounds IX, in alcohol, as, for example, ethyl, methyl, propyl, or the like, alcohol containing a few drops showing mineral acid, as of concentrated hydrochloric acid. The solution resulting from the boiling on cooling will deposit the compounds X as colorless, elongated prisms.

The compounds X include khellin, a known compound, heretofore, however, obtained only by extraction from vegetable matter. The several compounds related to khellin are new and have capacity for giving physiological effects rendering them useful in medicine.

As more specifically illustrative of the method in accordance with this invention and in exemplification of the method for the preparation of khellin and the several specific novel compounds having utility as intermediates in the preparation of khellin and which, in view of the foregoing general description of procedure according to the method for the production of khellin and related compounds will make obvious to those skilled in the art procedure for the preparation of the several compounds related to khellin, reference is made to Figure 2 of the drawings.

With reference to Figure 2 of the drawings, the first step involves the production of 2,4-dihydroxy - 3,6 - dimethoxybenzaldehyde (compound II), by treatment of dimethoxyresorcinol (compound I). The procedure is as follows:

A solution of 10 g. of dimethoxyresorcinol in 200 ml. of ether containing 10 ml. of hydrogen cyanide is saturated with hydrogen chloride at 0°. The following day the crystalline aldimine is collected, washed with ether and dissolved in 300 ml. of water. This solution is almost neutralized with solid sodium carbonate and then heated on the water bath for one-half hour, with the result that the aldehyde will quickly separate. The following day 10.5 g. of the aldehyde is washed and crystallized from alcohol, for example, methyl or ethyl alcohol, with the formation of elongated, faintly yellow needles having a melting point of 197° C., almost insoluble in water, sparingly soluble in alcohol, benzene or chloroform and readily soluble in acetone.

The second step involves the treatment of compound II for the production of 3,6-dimethoxy-2-hydroxy-4-benzyloxybenzaldehyde. The procedure is as follows:

4 g. of the aldehyde (compound II) is treated with 2.8 ml. of benzyl bromide or chloride and 12 g. of potassium carbonate in 200 ml. of boiling acetone for a period of about 1¾ hours. The potassium salts are removed by washing with hot acetone, the solution evaporated and the product triturated with water. On crystallization from methanol and then from ethanol the product is obtained in the form of colorless needles, M. P. 125° C., having a dark red alcoholic ferric reaction.

The third step involves the production of ethyl 2,5 - dimethoxy - 3 - benzyloxy - 6 - formylphenoxyacetate from compound III. The procedure is as follows:

A soution of 4 g. of the benzyl ether (compound II) in 75 ml. of acetone containing 2 ml. ethyl bromoacetate or ethyl chloroacetate and 10 g. of potassium carbonate is refluxed for five hours, or until a test portion of the reaction mixture gives a negative ferric reaction. The phenoxyacetate of compound III is isolated as an oil which will gradually crystallize. This material is washed with a little ether, say 20 ml., to remove traces of oily impurities, and then crystallized from a large volume of light petroleum, for example, B. P. 60–80° C., in the form of long, slender prisms, M. P. 85° C. and having a negative ferric reaction.

The fourth step involves the production of 4,7-dimethoxy - 6 - benzyloxy - 2 - carbethoxycoumarone from Compound IV. The procedure is as follows:

To a solution of 6 g. of compound IV in 40 ml. absolute alcohol there is added alcoholic sodium ethoxide (from 0.5 g. of sodium and 20 ml. of alcohol) and the mixture agitated until the solid dissolves, which will require about 10 minutes. The compounds V will be gradually deposited and will be recovered by filtration.

The fifth step involves the production from compound V of 6-hydroxy-4,7-dimethoxy-2-carbethoxycoumarone. The procedure is as follows:

2 g. of the compound V in solution in 100 ml. of acetic acid is treated with 150 ml. of hydrogen in the presence of a palladium-charcoal catalyst. Absorption of hydrogen will be complete in about 10 or 15 minutes and after removal of the catalyst by filtration, the filtrate is diluted with 300 ml. of water. The following day the resulting 6-hydroxy - 4,7 - dimethoxy - 2 - carbethoxycoumarone which has separated is collected and recrystallized from aqueous alcohol with the formation of colorless slender needles, M. P. 131° C., readily soluble in acetone or ethyl acetate and having a red sulfuric acid reaction.

The sixth step involves the production of 6-hydroxy - 4,7 - dimethoxy - 5 - acetyl - 2 - carboxycoumarone from the compound VI. The procedure is as follows:

A solution of 2 g. of compound VI in 70 ml. of pure nitrobenzene containing 2 ml. of acetyl chloride and 4 g. of an acid catalyst, as aluminum chloride, is vigorously stirred at a temperature of about 4° C. for 2 hours and then at room temperature for 48 hours. The reaction mixture is then poured onto ice, 500 g. of 150 ml. of a light petroleum (B. P. 60–80) is added to the reaction mixture and after about 3 hours the aqueous layer is removed and the light petroleum-nitrobenzene layer extracted with 50 increments of aqueous sodium hydrogen carbonate and then extracted 5 times with 50 ml. increments of aqueous sodium hydroxide. On acidification with hydrochloric acid of the combined aqueous sodium hydroxide extracts, a flocculent precipitate of 6-hydroxy - 4,7 - dimethoxy - 5 - acetyl - 2 -carboxycoumarone will be obtained, which crystallizes from methanol in tiny yellow needles (M. P. 252° C.), is moderately soluble in benzene or chloroform and has a green ferric reaction in alcohol.

The seventh step involves the production of khellinone, i. e., 6-hydroxy-4,7-dimethoxy-5-acetylcoumarone, from compound VII. The procedure is as follows:

3 g. of compound VII is decarboxylated by gentle refluxing with 10 ml. of absolute quinoline containing copper bronze catalyst for about 25 minutes. Then about 50 cc. of ether are added, the reaction mixture filtered and the filtered solution extracted five times with 20 ml. increments of 2 N hydrochloric acid to remove quinoline, then with aqueous sodium hydrogen carbonate to remove traces of unchanged acid and finally extracted six times with 15 ml. increments of 7% aqueous sodium hydroxide. The combined sodium hydroxide extracts are acidified with hydrochloric acid, saturated with ammonium sulfate and extracted several times with ether. Evaporation of the dried ethereal extracts gives a brown oil which gradually solidifies and which crystallizes from aqueous methanol to give a product in light brown prisms, which on repeated crystallization from the same solvent forms small yellow prisms (M. P. 100° C.) having a green ferric reaction and being identical in every way with a natural specimen of khellinone.

The eighth step involves the treatment of khellinone, compound VIII, for the formation of 6-hydroxy - 4,7 - dimethoxy - 5 - acetoacetylcoumarone. The procedure is as follows:

2 g. of compound VIII (khellinone), 25 cc. of ethyl acetate and 2 g. of metallic sodium, added in small pieces, are reacted. When the vigorous reaction has subsided, the mixture is heated on a steam bath for five hours with the addition of 1 g. of additional sodium in small pieces after two hours. To the reaction mixture there is then added a little methanol to destroy traces of metallic sodium and the mixture is then diluted with 300 ml. of water. The mixture is then acidified with acetic acid. A brown oil which gradually solidifies will settle out and which is dissolved in a large quantity of light petroleum (B. P. 70–100° C.). Part of the light petroleum is then distilled off, leaving a saturated solution which on cooling deposits the product as a crystalline material, which on recrystallization several times from benzene-light petroleum (B. P. 60–80° C.) gives the compound IX in the form of small yellow prisms, M. P. 105° C., and having a red ferric reaction in alcohol.

The ninth step involves the production of khellin, compound X, from the diketone, compound IX. The procedure is as follows:

A solution of 5 g. of the diketone, compound IX, in 8 ml. of alcohol containing 4 drops of concentrated hydrochloric acid boils for one minute. The resulting yellowish solution, on cooling, deposits khellin, compound X, in the form of colorless, elongated prisms, which, after recrystallization from aqueous alcohol have a M. P. of 153° C. and is undepressed on admixture with a natural specimen of khellin.

The following examples will serve as illustrative of the application of the method of this invention to the production of compounds related to khellin comprehended by this invention and of the intermediates comprehended by this invention within the scope of the general procedure and formulae given herein:

EXAMPLE 1

*3,6-dimethoxy-2-hydroxy-4-benzhydryloxy benzaldehyde*

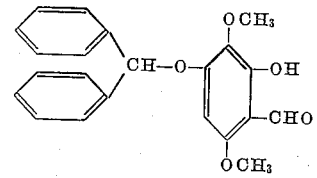

This compound will be prepared as described above for the preparation of compound III (Fig. 2) in the synthesis of khellin except that equimolar quantities of benzhydrylbromide or benzhydrylchloride instead of benzylbromide or benzylchloride will be reacted in an identical manner with 3,6-dimethoxy-2,4-dihydroxybenzaldehyde.

EXAMPLE 2

*Butyl 2,5-dimethoxy-3-benzyloxy-6-formylphenoxyacetate*

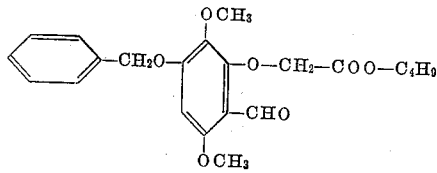

This compound will be prepared as described above for the preparation of compound IV (Fig. 2, in the synthesis of khellin, except that equimolar quantities of butyl α-bromoacetate or butyl chloroacetate instead of ethyl bromoacetate will be reacted in an identical manner with 3,6-dimethoxy-2-hydroxy-4-benzyloxy benzaldehyde (compound III). The other alkyl acetates corresponding to compound IV (i. e. the methyl, propyl, and amyl esters) will be prepared in an identical manner using the appropriate alkyl bromo- or chloroacetates (i. e. methyl, propyl, or amyl bromo- or chloroacetates).

EXAMPLE 3

*Methyl 2,5-dimethoxy-3-benzhydryloxy-6-formylphenoxyacetate*

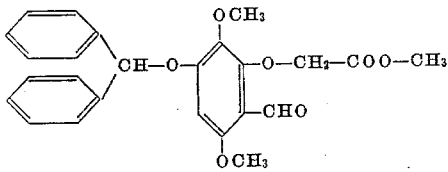

This compound will be prepared as described above for the preparation of compound IV (Fig. 2) in the synthesis of khellin, except that equimolar quantities of methyl bromoacetate instead of ethyl bromoacetate will be reacted with the compounds produced in Example 1 instead of compound III in an identical manner. The other alkyl acetates corresponding to this compound; i. e., the ethyl, propyl, butyl, and amyl, will be prepared in an identical manner using the appropriate alkyl bromo- or chloroacetate.

EXAMPLE 4

*4,7-dimethoxy-6-benzyloxy-2-carbutoxycoumarone*

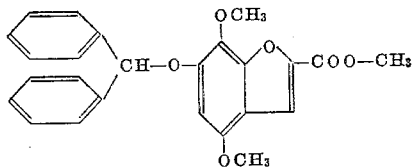

This compound will be prepared as described for the preparation of compound V (Fig. 2) in the synthesis of khellin, except that the compound produced in Example 2 will be reacted with sodium ethoxide in an identical manner, instead of compound IV.

EXAMPLE 5

*4,7-dimethoxy-6-benzhydryloxy-2-carbomethoxycoumarone*

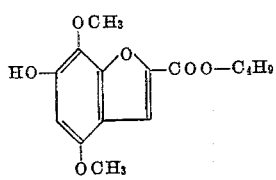

This compound will be prepared in the same manner as described for the preparation of compound V (Fig. 2) in the synthesis of khellin, except that the compound produced in Example 3 will be reacted with sodium ethoxide rather than compound IV.

EXAMPLE 6

*4,7-dimethoxy-6-hydroxy-2-carbutoxycoumarone*

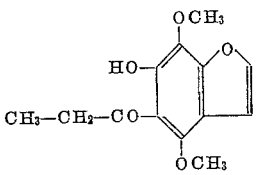

This compound will be prepared in the manner described for the preparation of compound VI (Fig. 2) in the synthesis of khellin, except that the compound prepared in Example 4 above will be reacted with hydrogen in the presence of a palladium-charcoal catalyst instead of compound V.

EXAMPLE 7

*4,7-dimethoxy-6-hydroxy-2-carbomethoxycoumarone*

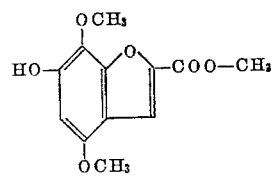

This compound will be prepared in the same manner as described for the preparation of compound VI (Fig. 2) in the synthesis of khellin, except that the compound prepared in Example 5 above will be reacted with hydrogen in the presence of palladium-charcoal catalyst instead of compound V.

EXAMPLE 8

*4,7-dimethoxy-6-hydroxy-5-propionyl-2-carboxycoumarone*

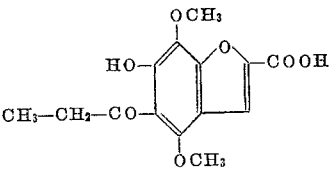

This compound will be prepared in the same manner as described above for the preparation of compound VII (Fig. 2) in the synthesis of khellin, except that compound VI is reacted with equimolar amounts of propionyl chloride instead of acetyl chloride in the presence of an acid catalyst such as aluminum chloride.

EXAMPLE 9

*4,7-dimethoxy - 6 - hydroxy - 5 - phenylacetyl-2-carboxycoumarone*

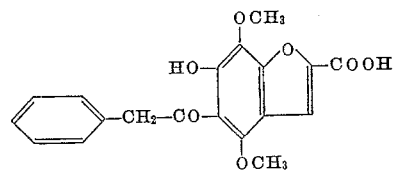

This compound will be prepared in a manner identical with the preparation of compound VII (Fig. 2) described above in the synthesis of khellin with the exception that equimolar amounts of phenylacetyl chloride will be used instead of acetyl chloride to react with the compound produced in Example 6 instead of compound VI.

EXAMPLE 10

*4,7 - dimethoxy - 6 - hydroxy - 5 - propionylcoumarone*

This compound will be prepared by refluxing 4,7 - dimethoxy - 6 - hydroxy - 5 - propionyl - 2 - carboxycoumarone prepared in Example 8 with copper bronze catalyst with absolute quinoline as described for the preparation of compound VIII (Fig. 2) in the synthesis of khellin.

EXAMPLE 11

*4,7 - dimethoxy - 6 - hydroxy - 5 - phenylacetyl-coumarone*

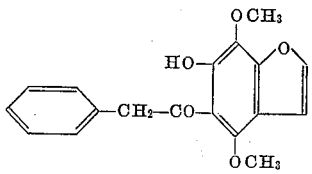

Decarboxylation of 4,7-dimethoxy-6-hydroxy-5-phenylacetyl-2-carboxycoumarone produced in Example 9 above will be effected in a manner identical with that described for the preparation of compound VIII (Fig. 2) in the synthesis of khellin.

EXAMPLE 12

*4,7 - dimethoxy - 6 - hydroxy - 5 - (β - acetopropionyl) coumarone*

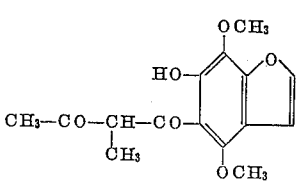

This compound will be prepared by reacting 4,7 - dimethoxy - 6 - hydroxy - 5 - propionylcoumarone prepared in Example 10 above with ethyl acetate in the presence of metallic sodium in a manner identical with that described for the preparation of compound IX (Fig. 2) in the synthesis of khellin.

EXAMPLE 13

*4,7 - dimethoxy - 6 - hydroxy - 5 - (β - benzoylpropionyl) coumarone*

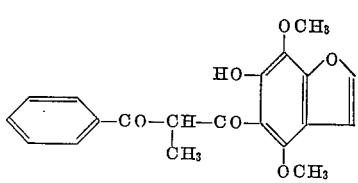

This compound will be prepared in a manner identical with that described in Example 12 above except that methyl benzoate will be reacted with the starting material produced in Example 10 rather than ethyl acetate.

EXAMPLE 14

*4,7 - dimethoxy - 6 - hydroxy - 5 - (β - phenylacetopropionyl) coumarone*

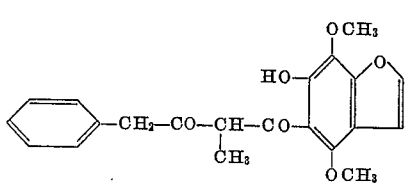

This compound will be prepared in the same manner as described for Example 12 above except that ethyl phenylacetate will be reacted with the compound produced in Example 10 instead of ethyl acetate.

EXAMPLE 15

*4,7 - dimethyl - 6 - hydroxy - 5 - (β-ethoxyacetopropionyl) coumarone*

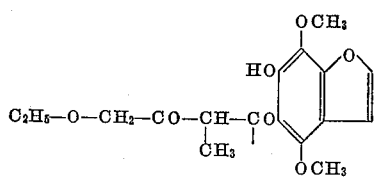

This compound will be prepared in a manner identical with that described in Example 12 above, except that methyl ethoxyacetate will be reacted with the compound produced in Example 10 instead of ethyl acetate.

EXAMPLE 16

*4,7 - dimethoxy - 6 - hydroxy - 5 - acetophenylacetylcoumarone*

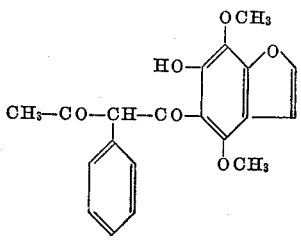

This compound will be prepared by reacting 4,7-dimethoxy - 6-hydroxy - 5 - phenylacetylcoumarone prepared in Example 11 with ethyl acetate in a manner identical with that described for the preparation of compound IX in the synthesis of khellin.

EXAMPLE 17

*4,7 - dimethoxy - 6 - hydroxy - 5 - benzoylphenylacetylcoumarone*

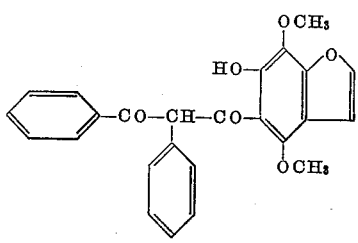

This compound will be prepared in a manner identical with that described for the preparation of Example 16, except that the compound produced in Example 11 will be reacted with methyl benzoate rather than ethyl acetate.

EXAMPLE 18

*4,7 - dimethoxy-6-hydroxy-5-phenylacetophenylacetylcoumarone*

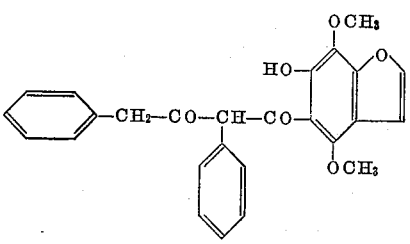

This compound will be prepared as described in Example 16 above with the exception that the compound prepared in Example 11 will be reacted with ethyl phenylacetate rather than ethyl acetate.

EXAMPLE 19

*4,7 - dimethoxy-6-hydroxy-5-ethoxyacetophenyl-acetylcoumarone*

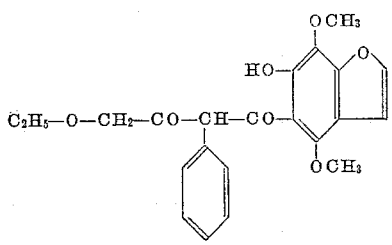

This compound will be prepared as described above for Example 16 except that the compound produced in Example 11 will be reacted with methyl ethoxyacetate instead of ethyl acetate.

It is believed that from the foregoing general and specific exemplification of the method according to this invention and of the several steps thereof and of the several novel intermediates produced by the various steps of the method, the application of the method for the production of the several compounds related to khellin as well as for the production of khellin has been made apparent, as has also the production of the several novel intermediates and the structure of the several novel intermediates.

What is claimed is:

1. The method of producing a compound having the structure

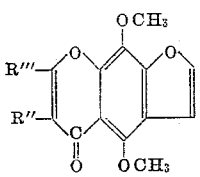

wherein R'' is a member of the group consisting of hydrogen, an alkyl group having not in excess of five carbon atoms, and a phenyl group and R''' is a member of the group consisting of alkyl groups having not in excess of five carbon atoms, a phenyl group, a phenylalkyl group the alkyl portion having not in excess of five carbon atoms and an alkoxyalkyl group having not in excess of ten carbon atoms, which comprises reacting dimethoxyresorcinol with hydrogen cyanide in the presence of hydrogen chloride with production of 2,4-dihydroxy - 3,6 - dimethoxy benzaldehyde, reacting the aldehyde produced with a member of the group consisting of a benzyl halide and a benzhydryl halide in the presence of alkali, reacting the product with an alkyl haloacetate, treating the intermediate thus produced with an alkali metal oxide and reducing the resultant product with hydrogen in the presence of a hydrogenation catalyst, subjecting the product of reduction to treatment with an acyl halide in the presence of an acid catalyst and decarboxylating the intermediate so produced by refluxing in quinoline in the presence of a copper-bronze catalyst, converting the product of decarboxylation to a diketone having the following structure

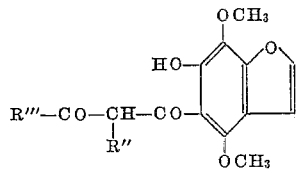

wherein R'' and R''' are as given above, by reacting the decarboxylated product with a lower alkyl acetate in the presence of an alkali metal to form said diketone, and boiling the diketone in acid solution to effect cyclisation.

2. The method of producing khellin which comprises reacting dimethoxyresorcinol with hydrogen cyanide in the presence of hydrogen chloride with production of 2,4-dihydroxy-3,6-dimethoxybenzaldehyde, reacting the benzaldehyde with a benzyl halide in the presence of potassium carbonate for the production of 3,6-dimethoxy-2-hydroxy-4-benzyloxybenzaldehyde, refluxing the said benzyl ether with ethyl haloacetate and potassium carbonate with production of ethyl 2,5-dimethoxy-3-benzyloxy-6-formylphenoxyacetate, treating the phenoxyaceate with sodium ethoxide with production of 4,7-dimethoxy-6-benzyloxy-2-carbethoxycoumarone, reducing the carbethoxycoumarone with hydrogen in the presence of a hydrogen catalyst with production of 6-hydroxy-4,7-dimethoxy - 2 - carbethoxycoumarone, reacting the last mentioned carbethoxycoumarone with acetyl chloride in the presence of an acid catalyst with production of 6-hydroxy-4,7-dimethoxy-5-acetyl - 2 - carboxycoumarone, decarboxylating the acetyl coumarone by refluxing in quinoline solution with a copper-bronze catalyst with production of khellinone, reacting the khellinone with ethyl acetate and an alkali metal with production of 6-hydroxy-4,7-dimethoxy-5-acetoacetyl-coumarone and boiling the said diketone in acid solution with production of khellin.

3. The steps in the method of producing khellin, which comprise reacting khellinone with ethyl acetate and metallic sodium initially at room temperature and subsequently heating said reaction and boiling an acid solution of the product.

4. The step in the method of producing a compound having the structure

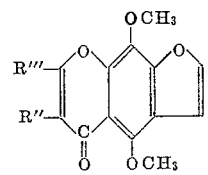

wherein R'' is a member of the group consisting of hydrogen, an alkyl group having not in excess of five carbon atoms, and a phenyl group, and R''' is a member of the group consisting of an alkyl group having not in excess of five carbon atoms, a phenyl group, a phenylalkyl group the alkyl portion having not in excess of five carbon atoms and an alkoxyalkyl group having not in excess of ten carbon atoms, which comprises reacting dimethoxyresorcinol with hydrogen cyanide in the presence of hydrogen chloride with production of 2,4-dihydroxy-3,6-dimethoxy benzaldehyde.

5. The steps in the method of producing a compound having the structure

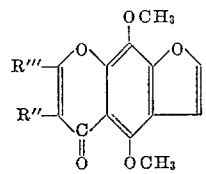

where R'' is a member of the group consisting of hydrogen, an alkyl group having not in excess of five carbon atoms, and a phenyl group, and R''' is a member of the group consisting of an alkyl group having not in excess of five carbon atoms, a phenyl group, a phenylalkyl group the alkyl portion having not in excess of five carbon atoms and an alkoxyalkyl group having not in excess of ten carbon atoms, which comprises treating a compound having the structure

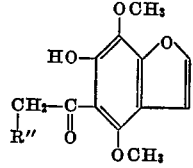

in which R" is as given above, with an ester of the acid corresponding to the R"'—CO radical, in which R"' is as given above, and boiling the product in acid solution.

6. Compounds having the structure

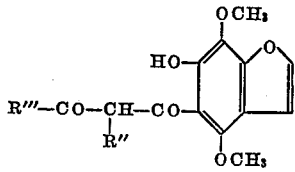

wherein R" is a member of the group consisting of hydrogen, alkyl having not in excess of five carbon atoms, and phenyl radicals; and R"' is a member of the group consisting of alkyl having not in excess of five carbon atoms, phenyl, phenylalkyl having not in excess of five carbon atoms in the alkyl portion, and alkoxyalkyl radicals having not in excess of ten carbon atoms.

7. A compound having the structure:

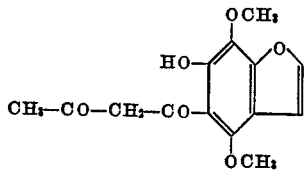

8. A compound having the structure:

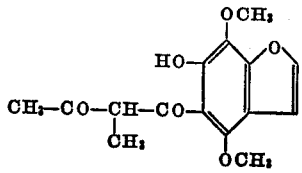

9. A compound having the structure:

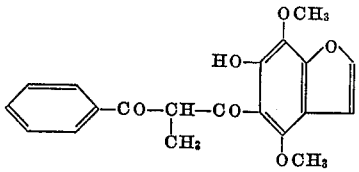

10. A compound having the structure:

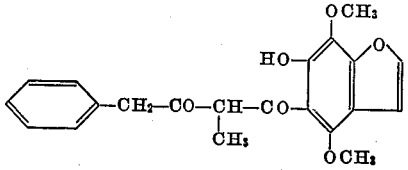

11. A compound having the structure:

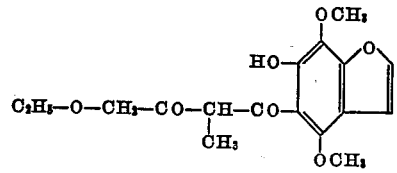

12. The process which comprises reacting a compound having the structural formula:

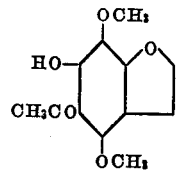

with an ester having the formula RCOOR' in which R is a member of the group consisting of lower alkyl and lower phenylalkyl; R' is lower alkyl, and subsequently boiling the resultant product in acid solution to effect cyclisation.

References Cited in the file of this patent

Baxter et al., J. Chem. Soc. (1949) S30–S33.
Clarke and Robertson, J. Chem. Soc. London, February 1949, 302–7.
Spath, Chemische Berichte, 71B, 106–13 (1938).